W. EBBITT.
Car-Brakes.

No. 140,260.  Patented June 24, 1873.

UNITED STATES PATENT OFFICE.

WILLIAM EBBITT, OF NEW YORK, N. Y.

IMPROVEMENT IN CAR-BRAKES.

Specification forming part of Letters Patent No. 140,260, dated June 24, 1873; application filed April 30, 1873.

*To all whom it may concern:*

Be it known that I, WILLIAM EBBITT, of the city, county, and State of New York, have invented a new and useful Improvement in Car-Brakes; and I do hereby declare the following to be a full, clear, and exact description thereof, which will enable those skilled in the art to make and use the same, reference being had to the accompanying drawing forming part of this specification, in which drawing—

Figure 1:
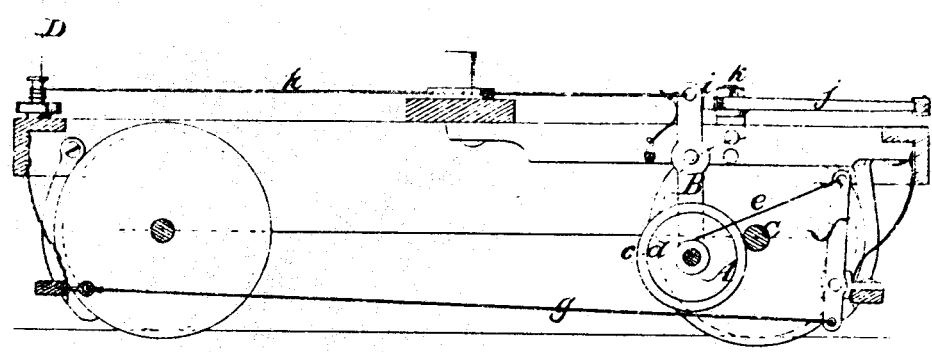
Figure 2:
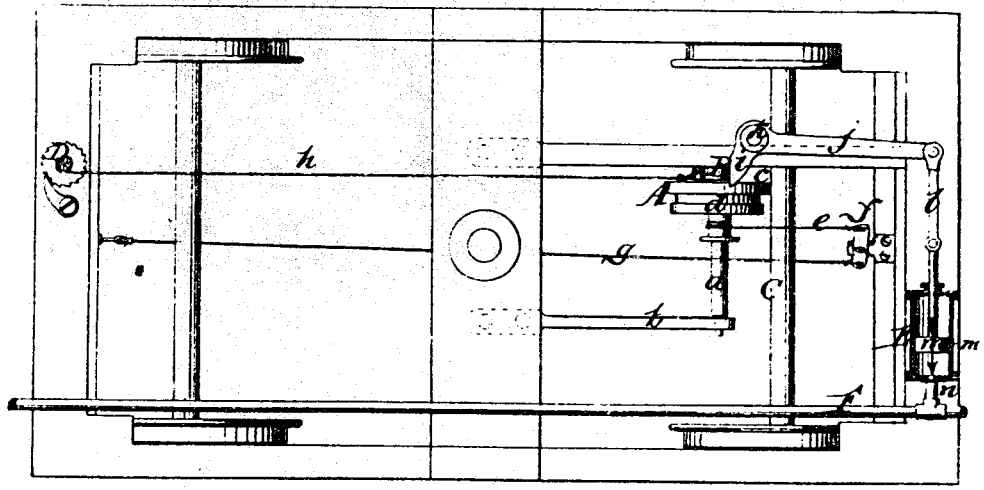

Figure 1 represents a longitudinal vertical section of this invention. Fig. 2 is a plan or top view of the same.

Similar letters indicate corresponding parts.

This invention relates to an improvement on that class of car-brakes which I have described in the patent No. 123,003, granted to me January 23, 1873; and the object of my present improvement is to substitute the pressure of air or steam for the brake rope or chain, and also to render my brake available as a hand-brake.

In carrying out my invention I use a friction windlass-pulley, A, by preference constructed in the manner described in my patent No. 122,818, dated January 16, 1872. This friction windlass-pulley is mounted on a shaft, $a$, which has its bearing at one end in a hanger, $b$, which is pivoted to the truck-frame of a railroad car, or to the under side of the platform of the engineer's cab, or to some convenient part of the tender; while the other end of said shaft has its bearings in a lever, B, which is so situated that, by its action, the friction-pulley can be pressed up against the periphery of one of the axles C, or of one of the wheels of the truck, tender, or locomotive. The friction windlass-pulley A is made in two parts, $c$ and $d$, the part $c$ being firmly keyed to the shaft $a$, while the part $d$ works in the part $c$, and turns loosely on the shaft $a$, the amount of power to turn it independent of the part $c$ being determined by suitable springs situated in the interior of the pulley, and producing the required amount of friction. The part $d$ of the friction windlass-pulley is provided with a hub, from which extends a rope or chain, $e$, to one of the brake-levers, $f$, that is hinged to one of the brake-heads, and connects with the other brake-head by a rope, chain, or rod, $g$, in the usual manner.

If the working-face of the friction windlass-pulley A is pressed up against the axle C while this axle is in motion, the rope $e$ winds up on the hub or shaft of said pulley, and the brakes are applied; and if the strain on the chain $e$ has reached the desired limit, the part $d$ of the friction windlass-pulley slips in the part $c$, and the breaking of the chain is prevented. At the same time the strain on the chain $e$ itself serves to keep the working-face of the friction windlass-pulley in contact with the axle C, so that comparatively little power is required to bring said pulley in action, and to cause the rope $e$ to wind up on its hub.

The lever B, which supports one end of the shaft $a$ of the friction windlass-pulley, connects, by a rope or chain, $h$, with a windlass, D, so that by turning said windlass the friction windlass-pulley can be brought in contact with the axle, and the brakes are applied with comparatively little power. With the lever B is combined a bell-crank lever, $i\,j$, which has its fulcrum on a pivot, $k$, and the short arm $i$ of which bears against the lever B, while its long arm $j$ connects by a rod, $l$, with the stem of a piston, $m$, that works in a cylinder, E. This cylinder connects at one end, by a branch-pipe, $n$, with a pipe, F, that extends throughout the entire length of the train, its sections being connected to each other by flexible pipes or other means, so as to make allowance for the motions of the cars, and to allow of connecting and disconnecting the same without difficulty.

In the example shown in the drawing, the pipe F connects with a suction apparatus, of any suitable construction, so that when the air is exhausted from said pipe the pistons of all the cylinders E (one such cylinder being situated under each car, and, if desired, also under the tender and locomotive) will move in the direction of the arrow marked thereon in Fig. 2, and thereby the friction windlass-pulleys are brought in action, and all the brakes in the train are applied.

It is obvious that, in order to obtain this result, the end of the pipe F at the last car in the train must be closed, and as soon as the suction apparatus is set in motion the brakes of all the cars will be applied in quick succession, commencing at those of the last car in the train.

It will be seen that, by means of the bell-crank lever *i j*, the power of the air on the piston *m* is multiplied, and a very small pressure of air will therefore be sufficient to bring the friction-pulley in contact with the axle C, and keep it there until it is drawn up tight by the rope or chain *e* winding up on the hub or shaft of the friction-pulley.

When the suction apparatus is stopped and air is admitted into the pipe F the brakes are taken off by their own springs, and the friction-pulley drops back out of contact with the axle C.

The suction apparatus which I use, by preference, consists of a steam-nozzle, constructed on the principle of an injector, and connected to the train-pipe F, which is the subject-matter of a separate application.

The advantage of the steam-nozzle is that it serves to exhaust the air in the train-pipe F as soon as steam is turned on, and no machinery is required for exhausting the air. It must be remarked, however, that the train-pipe F can be connected to an exhaust-pump, or to an exhaust apparatus of any desired description.

If desired, compressed air may be used, instead of the vacuum, and in this case the position of the branch-pipes *n*, leading from the train-pipe to the cylinders, has to be changed.

The same effect would also be obtained by using steam in the cylinders E.

What I claim as new, and desire to secure by Letters Patent, is—

1. The combination of a piston, *m*, a friction windlass-pulley, A, axle C, and brake-bar, substantially as described, for the purpose described.

2. The friction windlass-pulley A and lever B in combination with the multiplying-levers *i j*, and the piston *m* with axle C and brake-bar, substantially as described.

3. The windlass D, lever B, and friction-pulley A, in combination with the multiplying-levers *i j*, and piston *m*, axle C, and brake-bar.

WM. EBBITT.

Witnesses:
  W. HAUFF,
  E. F. KASTENHUBER.